United States Patent Office 3,579,304
Patented May 18, 1971

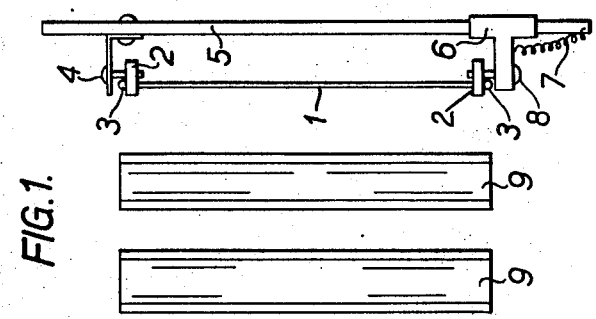
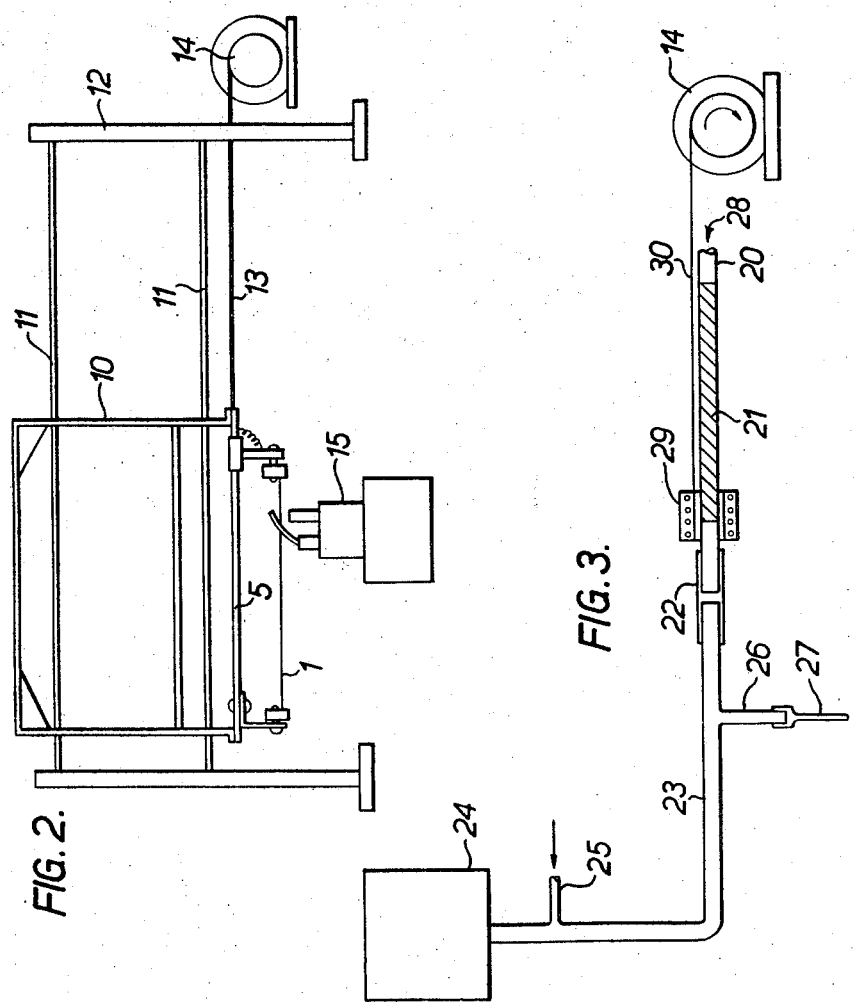

3,579,304
HEAT SCANNED CHROMATOGRAPHIC DETECTOR
Frederick Bolton Padley, Welwyn Garden City, England, assignor to Lever Brothers Company, New York, N.Y.
Filed Apr. 12, 1968, Ser. No. 720,871
Claims priority, application Great Britain, Apr. 21, 1967, 18,448/67
Int. Cl. G01n 31/12
U.S. Cl. 23—232       8 Claims

ABSTRACT OF THE DISCLOSURE

A method of detection particularly suitable to thin layer chromatography in which chemically separated materials on a carrier, produced for example by thin layer chromatographic elution, are scanned and detected by a heat source such as the flame of a flame ionisation detector.

---

The present invention is concerned with chromatographic detection methods and apparatus particularly suitable for thin layer and column chromatography although the invention is also applicable to other methods such as paper chromatography.

Normally with thin layer chromatography, after chromatographic elution of one or more materials along a carrier for a given period, e.g. in performing a chromatographic separation on a conventional glass plate, the position of the material or each material has to be located and it is desirable to estimate its quantity as well. The latter is normally carried out by extracting the separated component from the adsorbent and estimating it by weighing, by spectrophotometry or by gas liquid chromatography; or estimation of the separated components may be carried out by measurement of spot areas or by photodensitometry after detecting the components in a suitable way, for example by charring. Similar methods have to be used with other forms of chromatography, for example in one known method components separated by column chromatography are deposited on a wire or chain carrier which is subsequently heated in order to detect these components. However all these methods tend to be of limited scope, not normally being applicable to thin layer chromatography, or to require inconvenient additional process steps to remove the separated component from the adsorbent. The present invention is concerned with a chromatographic method of detection in which these shortcomings are reduced and a more direct and widely applicable form of operation can be achieved.

According to the present invention there is provided a method of chromatographic detection in which subsequent to chromatographic elution of at least one material along a carrier, the carrier is scanned by a heat source so as to cause said material to produce a gas when heated by said source, and said gas is detected thereby identifying, in dependence on the position of said heat source during detection, the position of said material on the carrier.

The invention also provides an apparatus for detecting chemically separated components on a carrier, comprising a holder for said carrier; a heat source which is arranged to heat said carrier and produce a detectable gas in dependence on the presence of a chemically separated material on the carrier; and scanning means for providing a scanning movement of said heat source relative to said holder to allow identification of the position on said carrier at which gas production from said material takes place. By chemical separation we mean separation due to selective molecular or ionic effects such as those which take place in chromatography or electrophoresis.

The present invention enables the position of the material or each material on said carrier to be readily identified by reference to the position of the heat source when detection takes place and moreover enables gas chromatographic detection equipment with its more refined measurement and display techniques such as strip chart recording and the like to be utilised in a particularly convenient and direct manner to analyse the chromatogram of a liquid-liquid or liquid-solid system, or even of liquid-gas systems to which the conventional gas chromatography detectors cannot normally be directly applied.

By the term "carrier" we mean the support on which the material or each material is positioned by a chemical separation technique such as chromatography, e.g., the carrier for the components or group of components of a mixture which have been subjected to chromatographic separation and this carrier may be a solid stationary phase on its own, a physical support for the stationary phase or combination of the stationary phase and a support therefor.

Thus the carrier may be the conventional glass plate of a thin layer chromatograph, the column system of a column chromatograph, the paper strip of a paper chromatograph (in which case heat should be sufficient to produce the gas but not to destroy the paper), or any other applicable porous, impermeable, tubular or laminar carrier but for the purpose of the present invention a particularly convenient carrier is a thin silica glass rod coated with the stationary phase of a thin layer system, e.g. silica, the use of glass being advantageous because of its low thermal conductivity.

The heat source may be the flame source of a flame-ionisation detector, particularly where a thin rod or plate is used as the carrier, and in this context a rod which is so thin as to be completely enveloped by the flame is advantageous. Another suitable system, particularly where a column system is the carrier, is a heating coil surrounding the carrier and carrying a heating medium, (e.g. an R.F. electric current). In the case where a column system is the carrier it is convenient to lead the gas so formed away to a suitable gas chromatographic detector at a separate location.

The heat source will apply heat to the carrier so that production of the gas takes place at a small identifiable area of the carrier, the smaller the better for good selectivity, and as scanning takes place the heat source will be moved relative to the carrier so that the area of gas production will change in an identifiable manner. Scanning will preferably be along the path taken by the mobile phase during production of the chromatogram and should be in a uniform and reproducible manner to ensure positive identifiacation of the position at which gas production takes place. Scanning may be of a two dimensional separation if desired, and it will not be necessary to scan the whole chromatogram path nor to vaporize off, or gasify, the whole of the separated component. In a preferred arrangement a strip chart recorder will record the detection of the gas and movement of the scale of the strip chart recorder will be directly related with the scanning movement. The scanning movement will generally be by relative movement between the carrier and the heat source, and this may be achieved by movement of either the carrier or the heat source or both.

Heat from the heat source will cause a chromatographically eluted material on the carrier to produce a gas and the mechanism by which this is achieved should be selected by the operator in dependence on the properties of the material to be detected. In some cases heat alone will be sufficient to cause vaporisation of the said material, in which case the gas will usually be a reliquefiable vapour, in other cases it will be necessary to cause sublimation or pyrolysis of the material and in still further cases it may be necessary to apply some initial treatment to the material on the chromatogram carrier, e.g. the spraying on of a reagent, before heat treatment will produce a detectable gas.

As previously inferred, the invention is applicable to chromatographic systems where the stationary phase is a solid or a liquid and the mobile phase is a liquid or a gas. It will be appreciated therefore that when a chromatographically eluted material is to be detected in accordance with the invention it may in some cases be necessary to take specific steps to distinguish between the material to be detected and the other phases of the system which may also tend to vaporise off with heat, particularly the stationary phase if liquid, which will usually be present on the chromatogram carrier at the time detection is required. In the simplest cases it will be merely necessary to wait for the unwanted component to evaporate off the carrier before applying heat, in other cases heating at selected temperatures will provide separation of the material to be detected and in still further cases the spraying on of a reagent or some other treatment to the carrier may be necessary to enable heat to selectively detect only the required material as a gas. A further method is for the gas detector itself to distinguish between wanted and unwanted gases.

The gase is detected by any suitable detector such as an argon detector, a flame-ionisation-detector or a catherometer but where the carrier is in the form of a thin rod or other carrier for a thin-layer system the flame-ionisation-detector is preferable since its flame can at the same time serve to provide the heating. Detection in its simplest form will merely determine whether or not a particular material is present on the carrier by virtue of the position of gas production, however specific separations can be detected by making use of selective heating on the carrier, e.g., scanning at different temperatures or of the separating properties of particular forms of gas detector and moreover the invention may, in many cases, be used to make quantitative analyses of the separated products by use of a calibrated detector.

Two examples of the invention as applied to thin layer chromatography and to column chromatography respectively will now be described by way of example with reference to the accompanying drawings:

FIG. 1 shows a side elevation of a chromatogram carrier mounted in a holder;

FIG. 2 shows the chromatogram carrier and holder in a scanning rig; and

FIG. 3 shows a detection system for a liquid-liquid column.

FIGS. 1 and 2 illustrate the first embodiment of the invention.

Referring to FIG. 1, a glass silica rod 1, 20 centimetres long and approximately 0.5 millimetre in diameter is suspended between two attaching nuts 2. The attachment is by virtue of slots (not shown) in the nuts 2 which are wide enough to allow passage of the rod 1 but not of a pair of beads 3 at the ends of the rod. At the upper end of the rod a bolt 4 carries one of these nuts 2 and is firmly attached to a holder bar 5. At the bottom end of the rod, a slider 6 mounted on the holder bar 5 and resiliently urged downwards by a spring 7 carries a second attaching bolt 8 onto which the lower attaching nut 2 is threaded.

During production of the chromatogram on the carrier rod 1 the carrier rod 1 while attached in its carrier assembly as shown in FIG. 1 is enclosed by two halves 9 of a split glass tube. These two halves fit on the carrier nuts 2 by means of suitable clips, thereby surrounding the carrier rod 1 to form, in effect, a chromatographic tank which can retain a saturated atmosphere around the rod.

In practice in order to provide a chromatographic separation, the glass rod and the interior of the split glass tube halves are coated with the stationary phase of the system. In one example, where a separation of glycerides was required, a coating of silica was applied by dipping in a slurry of silica gel G (30 grams) in chloroform (50 ml.). Other coatings, for example, silver nitrate impregnated silica, will be applied when other separations are required.

In a particular example of a chromatographic separation using the equipment above described, a mixture of mono-, di- and tri-glycerides was applied in a solution of chloroform to the silica coated glass rod 1 two centimetres from the bottom end. The split glass tube halves 9 were then clipped round the rod, and its lowermost end was dipped in a beaker containing a quantity of a hexane-ether solvent mixture (6:4) which served as the mobile phase. The chromatogram was then developed for twenty minutes to provide separation of the components of the mixture along the rod.

The various materials chromatographically eluted along the rod were then, subsequent to evaporation off of the mobile phase, detected in the arrangement shown in FIG. 2.

Referring to FIG. 2, the carrier bar 5 with its attached rod 1 carrying the chromatographically deposited material, but with the split glass tube halves 9 removed, was attached to a jig 10. This jig 10 was arranged to move along guide rods 11 on a framework 12 in a longitudinal direction. The jig 10 was drawn via a wire 13 attached to a constant speed motor 14. A flame-ionisation-detector 15 together with its associated amplifying and recording equipment was located so that the glass rod 1 passed through the flame during movement of the jig 10 in the direction of the motor 14, thus enabling the flame-ionisation-detector heat source to scan the chromatogram carrier 1.

The optimum position of the rod in the flame was determined experimentally and found to give greatest sensitivity when the rod passed approximately 1 millimetre below the top of the flame and was thus completely enveloped thereby. This enabled material all round the rod to be satisfactorily heated. In practice the flame-ionisation-detector 15 was operated with a supply of pure hydrogen at 5 millimetres per minute and the rod carrying the separated glycerides previously described was driven at a constant known speed past the flame. The strip chart recorder of the flame-ionisation-detector was also driven at a constant known speed and it was found that the separated components of the mixture were readily identifiable on the strip chart recording as a series of peaks. It was found, moreover, that by taking into account the relative speeds of the motor 14 and of the strip chart recorder a quantitative assessment of the various components separated chromatographicaly on the rod could be obtained.

FIG. 3 illustrates a second embodiment of the invention. In this embodiment a chromatographic column 20 packed with 100–120 mesh silica gel 21 is, subsequent to the operation of chromatographic separation, connected in the arrangement shown in FIG. 3.

In one particular example of such a chromatographic separation a mixture of hydrocarbons (liquid paraffin), methyl esters and short chain glycerides was separated on such a column using a mixture of ether and petrol ether (1:20) as the solvent to elute the column. Sufficient solvent was passed down the column to separate the components of the mixture but not to elute them completely from the column. The solvent was removed from the column by blowing nitrogen through the column at 100° C. for a relatively short time; and the column was then connected in the apparatus as shown in FIG. 3.

Referring to FIG. 3, one end of the column 20 was attached via a coupling 22 to a piping system 23 leading to a flame-ionisation-detector 24 and its associated amplifying and recording equipment. The piping 23 had an inlet 25 for hydrogen and an outlet 26 terminating in a hypodermic needle 27 which vented to atmosphere in order to regulate the amount of gas passing to the flame-ionisation-detector. A nitrogen gas supply was connected to the other end of the column 20 for the purpose of carrying gases from the column to the flame-ionisation-detector where it mixed with hydrogen flowing in through the inlet 25.

An electrical heating coil 29 surrounding the column 20 was attached via a wire 30 to the pulley of a constant speed motor 14 so that rotation of the motor pulley would draw the heater 29 at a constant speed along the column in a scanning movement.

In operation the column 20 carrying the chromatographically deposited separated components of the mixture was scanned by the heating coil at 2.5 centimetres per minute providing heating to a temperature in the range 500° C. to 700° C. The components on the chromatographic column were either cracked or vaporised and carried by the nitrogen gas flow to the flame-ionisation-detector, adjustments having previously been made to the hypodermic needle 27 to ensure that the flame-ionisation-detector 24 was not overloaded. Flow of nitrogen through the tube was approximately 40 millilitres per minute.

As with the previous example by correlating the speeds of scanning movement and of strip chart recording, a series of peaks indicating the separated components on the strip chart recorder was obtained and it was possible to make a quantitative analysis of these.

What is claimed is:

1. A method of chromatographic detection comprising the steps of eluting by thin layer chromatography at least one material along a carrier having a stationary phase, scaning said carrier with said eluted material with a heat source so as to cause said material to produce a gas when heated by said source, and detecting said gas thereby identifying, in dependence on the position of said heat source during detection, the position of said material on the carrier.

2. A method according to claim 1 in which chromatographic elution takes place on a carrier in the form of a thin rod.

3. A method according to claim 2 in which said thin rod is of glass.

4. A method according to claim 2 in which said step of eluting the material along the carrier is performed by applying a surface coating to said rod, applying a mixture to a point near one end of said rod, enclosing said rod in a pair of split tube halves, immersing said end of the enclosed rod in an eluent and maintaining the enclosed immersed rod in a saturated atmosphere for sufficient time to elute the mixture along the rod.

5. A method according to claim 2 in which said thin rod is scanned by the flame of a flame ionisation detector.

6. An apparatus for detecting chemically separated components comprising a carrier having a stationary phase upon which chromatographic elution of said components occurs, a holder for said carrier, a heat source which is arranged to heat said eluted components on the stationary phase of said carrier and produce a detectable gas in dependence on the presence of a chemically separated material on the carrier and scanning means for providing a scanning movement of said heat source relative to said holder to allow identifiaction of the position on said carrier at which gas production from said material takes place.

7. An apparatus according to claim 6 in which said heat source is the flame source of a flame ionisation detector.

8. An apparatus according to claim 7 in which said carrier is in the form of a thin rod which, when attached in said holder, is arranged to be enveloped by said flame and scanned by movement of said holder relative to said flame source.

References Cited
UNITED STATES PATENTS 3,128,619    4/1964    Lieberman _____ 23—232CUX
3,419,359    12/1968    Anderson et al. ____ 23—232EX

OTHER REFERENCES

Stahl, E.: Thin-Layer Chromatography, A Laboratory Handbook, pp. 34 to 36.

MORRIS O. WOLK, Primary Examiner

R. M. REESE, Assistant Examiner

U.S. Cl. X.R.
23—254, 255, 230